Feb. 3, 1959 R. F. BARRETT 2,872,211
APPARATUS FOR RETRACTING MUDGUARDS
Filed Aug. 6, 1957
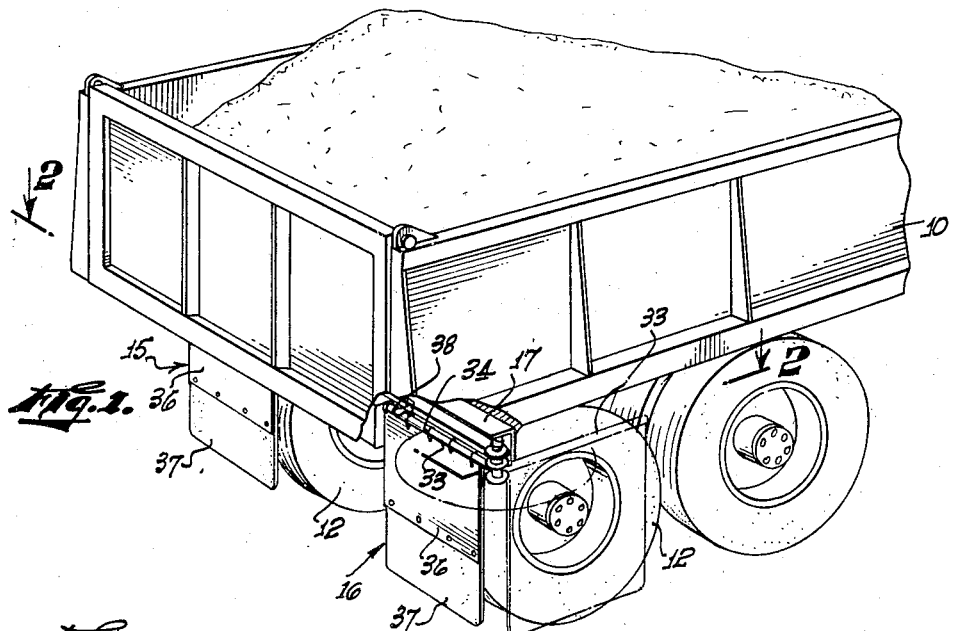
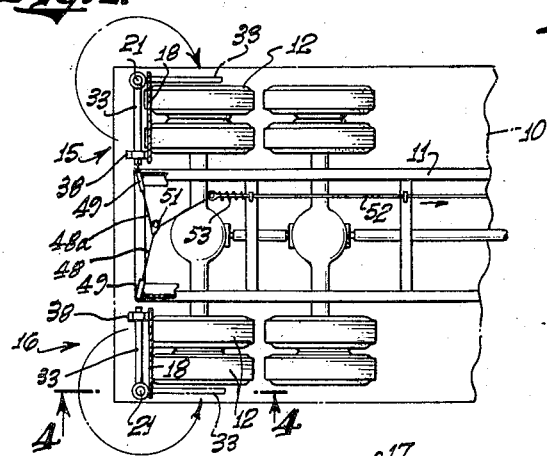
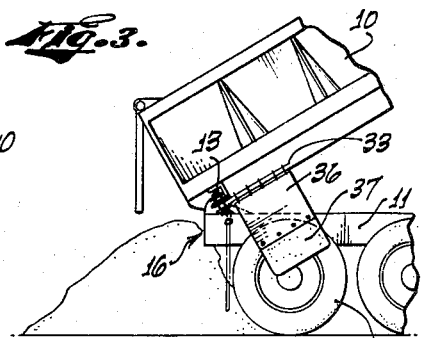
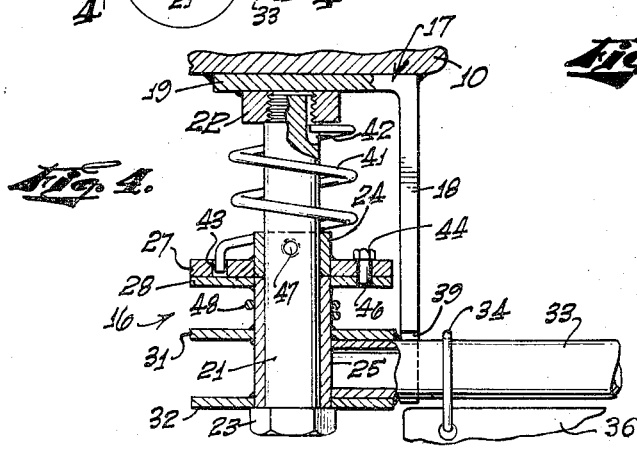
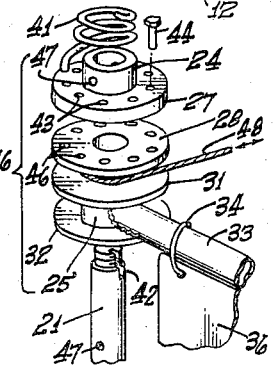
INVENTOR.
ROBERT F. BARRETT,
BY
ATTORNEY.

United States Patent Office 2,872,211
Patented Feb. 3, 1959

2,872,211

APPARATUS FOR RETRACTING MUDGUARDS

Robert F. Barrett, Orange, Calif., assignor of one-half to Fred W. Kerns, Long Beach, Calif.

Application August 6, 1957, Serial No. 676,688

7 Claims. (Cl. 280—154.5)

This invention relates to mudguard retracting apparatus, and is particularly adapted for use on a dump truck in order to prevent the mudguards from being caught and damaged in the load dumped from the truck.

Mudguards for dump trucks are required by law in many states, but present substantial problems because of their tendency to become caught in the loads dumped from the trucks. Once caught, the mudguards are frequently torn or ripped off when the truck drives away, which means that a single truck may require a number of sets of mudguards in a relatively short period of time.

In attempting to solve the above problem, prior art workers have resorted to mudguards which are associated with the tailgate, mudguards which slide up underneath the bed or body of the dump truck, etc. Such apparatus, however, has not had any substantial measure of commercial success and is characterized by a number of important defects. Not only is such apparatus relatively expensive and hard to install, but it frequently does not operate to shift the mudguard to a position at which it cannot possibly be fouled by the material dumped from the truck. Furthermore, and very importantly, much of such apparatus tends to become fouled or clogged by the dirt which is present under the truck, so that it frequently becomes inoperative and requires servicing.

In view of the above and other factors characterizing apparatus of the type indicated, it is an object of the present invention to provide an improved apparatus for retracting mudguards on dump trucks, such apparatus including means for shifting the mudguards to positions at the sides of the truck bed or body and adjacent the truck wheels, where the mudguards may not possibly become fouled by the material dumped from the truck.

Another object is to provide mudguard retracting apparatus which is relatively simple and economical to construct and operate, and which will not become inoperable despite the effects of grime and mud under the truck.

A further object is to provide mudguard retractors incorporating improved spring bias means, actuating means, and latch means adapted to insure that the mudguards are in their operative positions even in situations where there is a breakdown of the operating mechanism.

These and other objects and advantages of the invention will be more fully set forth in the following specification and claims, considered in connection with the attached drawing to which they relate.

In the drawing:

Figure 1 is a perspective view illustrating a mudguard retracting apparatus constructed in accordance with the present invention, as mounted at the rear of a conventional dump truck;

Figure 2 is a fragmentary section taken on line 2—2 of Figure 1;

Figure 3 is a fragmentary side elevation, illustrating the mudguards in retracted positions and showing the bed or body of the truck in tilted position;

Figure 4 is an enlarged section taken on line 4—4 of Figure 2, the mudguard and associated crank being illustrated in retracted position; and Figure 5 is an exploded view of the spring bias and other mechanism associated with the crank on which each mudguard is mounted.

Referring to the drawing, and particularly to Figure 1, the invention is illustrating as incorporated in a conventional dump truck having a tiltable bed or body 10, a generally horizontal frame 11, and rear wheels 12. The extreme rear wheels are located at the sides of the frame and below the outer rear corner positions of the bed. The bed or body 10 is adapted to be tilted, to the inclined position illustrated in Figure 3, by operation of suitable unshown hydraulic apparatus. The axis of rotation of the bed 10 is at the rear of frame 11, being indicated at 13 in Figure 3.

Retractable mudguard assemblies, constructed in accordance with the invention, are indicated generally at 15 and 16, there being one assembly behind each pair of rear wheels 12. Since the assemblies 15 and 16 are identical to each other except that they are left and right, only the right one 16 will be described in detail herein.

Mudguard assembly 16 comprises a mounting and mud-deflecting element 17, preferably an angle iron, which is suitably welded to the underside of bed or body 10 above the rearmost portions of wheels 12. Angle iron 17 extends perpendicular to the longitudinal axis of the truck, and is substantially longer than the width of each pair of dual rear wheels. Referring to Figure 4, it will be understood that the downwardly extending rear flange 18 of angle iron 17 has the effect of shielding the upper portions of the operating elements from dirt thrown out from beneath the truck body.

Mounted at the underside of the horizontal flange 19 of angle iron 17, and at the extreme outer end of the angle iron, is a downwardly extending stub shaft 21. The upper end of the vertical stub shaft 21 is fixedly and non-rotatably secured in position, for example by being force-threaded into a nut 22 welded on flange 19. The lower end of stub shaft 21 is provided with a bolt head 23 which is shown as being disposed slightly lower than the lower edge of vertical flange 18.

Rotatably mounted on the stub shaft 21 are upper and lower sleeves 24 and 25, respectively, the adjacent ends of which have annular flanges 27 and 28 welded thereto. The upper sleeve 24 is spaced a substantial distance below nut 22, to provide room for the spring means to be described below; whereas the lower sleeve 25 seats rotatably on the bolt head 23.

Welded in spaced relation at the lower portion of sleeve 25 are a pair of annular flanges 31 and 32. A horizontal crank 33 is rigidly welded to the flanges 31 and 32 and also to sleeve 25, and extends radially outwardly from the sleeve for a distance substantially equal to the width of one set of rear truck wheels 12. The crank 33 is adapted to support a mudguard element, for example by means of wire loops 34 which extend through holes in the mudguard. The illustrated mudguard comprises an upper metal portion 36 to which is secured, by means of suitable bolts or rivets, a lower rubber portion 37.

Crank 33 is rotatable (along with sleeve 25 and flanges 31 and 32) through substantially a 270° angle between its operative and retracted positions. When in operative positions, the crank 33 and mudguard are disposed perpendicular to the longitudinal truck axis, and at the rear of wheels 12, being associated with a suitable latch or detent element indicated schematically at 38. Element 38, which also acts as a stop, may be of any suitable construction (such as a spring-pressed ball over which the end of crank 33 may ride due to operation of the shifting or actuating means to be described subsequently) and performs the function of insuring that the crank will be disposed in operative position at all desired times, even in the event of failure of the mechanism to be described hereinafter. When in retracted positions, the crank 33 and mudguard extend parallel to the longitudinal axis of the truck and are disposed laterally adjacent the rearmost truck wheel 12. Such retracted crank position is determined by the lower end portion of angle iron flange 18, which may be suitably cut back as indicated at 39 (Figure 4), and which performs the function of a stop.

Proceeding next to a description of the spring means for biasing the crank 33 and connected mudguard to a predetermined position, preferably the operative one, these means comprise a helical spring 41 which operates as a torsion spring. Referring to Figures 4 and 5, the upper end of spring 41 extends into a groove 42 formed in stub shaft 21 at nut 22, thus effectively holding the upper end of the spring against rotational movement. The lower end of spring 41 extends selectively into any one of a plurality of circumferentially spaced holes 43 in flange 27. A pin 44, inserted through another one of the holes 43 and also through one of a plurality of circumferentially spaced holes 46 in flange 28, prevents rotational movement of the flanges 27 and 28 relative to each other.

The tightness or bias of spring 41 may be readily adjusted by holding the flange 27 against rotation, such as by means of a pin (unshown) extended through a hole 47 through sleeve 24 and through shaft 21, and then removing pin 44 and rotating crank 33 to a desired position. The pin through hole 47 is then removed, after pin 44 is reinserted in the proper corresponding holes 43 and 46, and the effective spring bias thus effectively altered.

As previously indicated, the mounting of spring 41 is preferably such that crank 33 is biased to the operative position shown in Figures 1 and 2, a mudguard then being disposed to the rear of wheels 12. The means for shifting the crank 33 and mudguard to the inoperative or retracted positions comprises a cable which is secured to sleeve 25 between flanges 28 and 31 and is wrapped around such sleeve for at least one revolution. The cable, numbered 48, extends slidably through a guide tube 49 (Figure 2) on frame 11 for connection to a floating pulley 51. In the illustrated embodiment, cable 48 is connected to the frame of the pulley 51, and the corresponding cable 48a from the left mudguard assembly 15 is connected around the roller of pulley 51 and to the end of a rod 52. Rod 52 is slidably mounted in frame 11 of the truck, being biased rearwardly by a suitable spring 53 mounted thereon. The rod 52 extends forwardly to a suitable brake-like lever element, preferably mounted in the cab of the truck, which is adapted to be operated to shift the rod between forward and rear longitudinal positions. The brake-like actuating element, not shown, is provided with suitable means to lock the rod 52 in either forward or rear longitudinal position.

Operation

Let it be assumed that parts are initially in the operative positions illustrated in Figures 1 and 2, cranks 33 then being disposed transverse to the truck and held by the latch or detent elements 38. Rod 52 is then in a rearward-shifted position, and cables 48 and 48a are relatively slack. The cranks 33 are held in the operative positions not only by the elements 38 but also by the bias of springs 41, which means that the mudguards are sure to remain in the operative positions even in the event of malfunctioning of the cables from the rod 52, or of the actuating means for the rod.

After the dump truck has moved to a spot where the load is to be deposited, the operator merely shifts the unshown actuating means to pull rod 52 forwardly against the bias of spring 53. This tightens the cable 48a, and thus cable 48, and causes the lower sleeve 25 of both assemblies 15 and 16 to rotate. Crank 33 of left assembly 15 then rotates clockwise as viewed in Figure 2, and crank 33 of right assembly 16 rotates counter-clockwise, it being understood that the cable tension is sufficient to automatically release the detent elements 38, as well as to overcome the bias of spring means 41.

The above-indicated rotation of the cranks 33 continues until the stop portions 39 of angle iron flanges 18 are engaged, the mudguards then being disposed laterally adjacent the rear truck wheels 12 as indicated in phantom in Figure 1, and in Figure 3. The cranks and mudguards are held in such retracted positions by means of the cables, it being understood that the rod and cable-actuating lever (unshown) is suitably locked in position to effect such action.

The hydraulic apparatus of the truck is then operated to tilt the bed 10 to its upper position, shown in Figure 3, and this has the effect of causing the mudguards to move even farther from the rear of the truck where they might be fouled in the deposited load. Since the guides 49 and outer cable portions are disposed closely adjacent the axis of rotation or bearing 13 of the truck body or bed 10, the tilting of such bed has little or no effect on the rotated positions of the cranks 33.

After a load is deposited and the bed is again resting on the frame 11, the operator merely releases the actuating means and thus permits the springs 41 to rotate the cranks to the operating positions as before.

Various embodiments of the present invention, in addition to what has been illustrated and described in detail, may be employed without departing from the scope of the accompanying claims.

I claim:

1. A retractable mudguard apparatus for a dump truck or similar motor vehicle, which comprises pivot means disposed at the outer rear portions of said dump truck and generally above the rear wheels of said dump truck, a crank mounted on said pivot means for pivotal movement between an operative position disposed transverse to the longitudinal axis of said dump truck and generally above the rear portions of said rear truck wheels and a retracted position disposed outwardly from the side of said dump truck, and a mudguard mounted on said crank and adapted to depend behind the rear-most wheels of said truck when said crank is in said operative position and to be disposed away from a position behind said rearmost truck wheels when said crank is in said retracted position, and means to rotate said crank between said operative and retracted positions.

2. The invention as claimed in claim 1, in which said last-named means includes remote-operated cable means adapted to rotate said pivot means, and spring means to bias said pivot means and crank toward one of said operative or retracted positions.

3. Mudguard retracting apparatus for a dump truck, which comprises a drum element mounted at the outer rear portion of said dump truck for rotation about a generally vertical axis, a crank element operatively associated with said drum element and adapted to rotate about a generally vertical axis as a result of rotation of said drum element, a cable wound on said drum element and extending to a remote location, a mudguard element mounted on said crank element and adapted to be rotated therewith and in response to operation of said cable between an operative position to the rear of the rearmost truck wheels and a retracted position laterally and outwardly adjacent said rearmost truck wheels.

4. The invention as claimed in claim 3, in which rotation of said crank is through an angle of substantially 270° between a position perpendicular to the longitudinal truck axis and a position parallel thereto, and in which said drum element is rotatably mounted on the bed or body of said dump truck, whereby tilting of said bed or body effects further withdrawal of said mudguard from the area or region of the deposited load.

5. The invention as claimed in claim 3, in which means are provided to bias said crank and mudguard to said operative position, and means are provided to adjust the degree of bias effected by said bias means.

6. The invention as claimed in claim 3, in which shield means are provided to minimize contamination of said drum element by dirt thrown out from beneath the truck.

7. The invention as claimed in claim 3, in which latch or detent means are provided to aid in maintaining said crank in its operative position except during intentional shifting thereof to said retracted position.

References Cited in the file of this patent

UNITED STATES PATENTS

| | | |
|---|---|---|
| 2,605,119 | Earnest | July 29, 1952 |
| 2,653,846 | Wiley | Sept. 29, 1953 |
| 2,721,760 | Lapham et al. | Oct. 25, 1955 |